Oct. 25, 1932.  I. D. PERRY  1,884,832
DOOR BUMPER AND THE LIKE
Filed Sept. 16, 1931
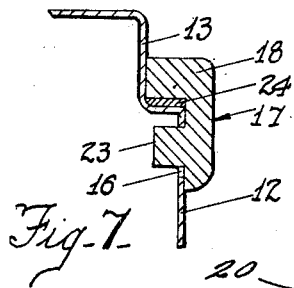
Fig. 7.
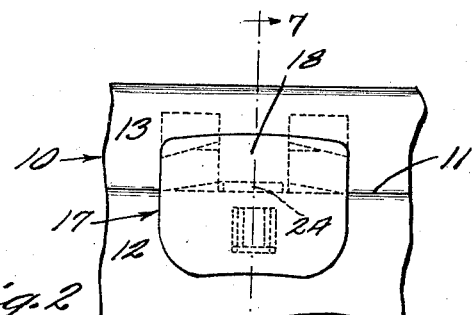
Fig. 2.   Fig. 1.
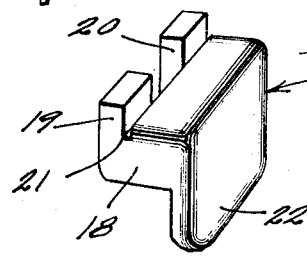
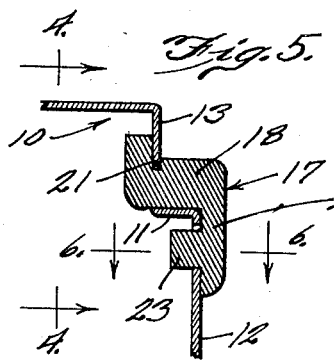
Fig. 5.
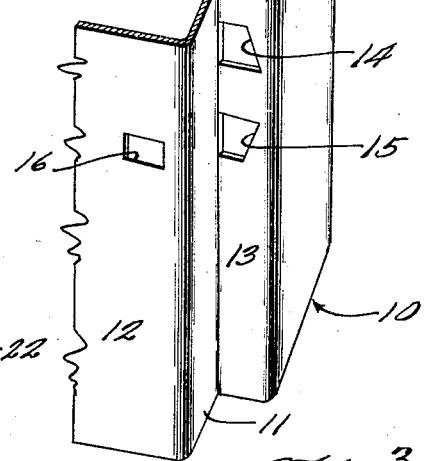
Fig. 3.
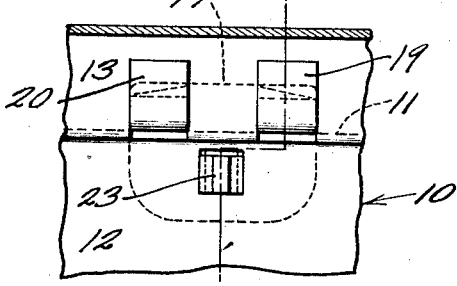
Fig. 6.
Fig. 4.
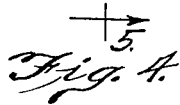
Inventor:
Ira D. Perry
By Thos. A. Banning
atty.

Patented Oct. 25, 1932

1,884,832

UNITED STATES PATENT OFFICE

IRA D. PERRY, OF CHICAGO, ILLINOIS, ASSIGNOR TO EDNA L. MEYER, OF ROCKFORD, ILLINOIS

DOOR BUMPER AND THE LIKE

Application filed September 16, 1931. Serial No. 563,059.

This invention has to do with certain new and useful improvements in door bumpers and the like. The door bumper constructions herein disclosed are especially intended for use in connection with the doors of automobile bodies and the like, although it will appear that said features may also be used to advantage in connection with other constructions. Inasmuch, however, as said features have been devised especially with a view to meeting the requirements of automobile doors, I have illustrated and will particularly describe such uses and application of the invention, but in so doing I wish it clearly understood that I do not thereby intend to limit myself except as I may do so in the claims.

In the construction of automobile bodies it is customary to provide a door frame member or element against or towards which the edge portion of the door moves during the door closing operation. Usually this element is in the form of what is known as a door pillar. The door pillar is generally so formed as to provide a ledge facing in the direction of door closing movement and also to provide inwardly extending flanges lying parallel to the direction of door closing movement. Generally said pillar is also provided with an outwardly extending flange which also lies parallel to the direction of door closing movement.

The companion edge portion of the door is so formed as to provide companion ledges and flange surfaces; the ledge of the door approaching directly towards the ledge of the door pillar, and the flanges of the door moving parallel to or wiping close to the flanges of the door pillar.

It is usually customary to provide one or more bumper blocks on the door pillar in position to receive the forces of pressure and impact incident to the door closing operation. Generally these bumper blocks on the door pillar are provided with head portions which are supported by the door pillar or some element thereon and the ledge of the door strikes or presses against the head portion of the bumper block when the door is closed. The bumper block is also usually provided with a lip or skirt portion which overlies the inwardly extending flange at the position of the bumper block and establishes a wiping contact surface against which the companion flange surface of the door wipes during the door closing movement.

The main object of the present invention is to provide a door pillar construction together with the bumper block therefor, which parts are so arranged that the body portion of the bumper block is normally directly sustained or supported by the ledge of the door pillar or a shim thereon, so that the forces of pressure and impact incident to the door closing operation will be transmitted from said bumper block head to the ledge of the door pillar either directly or through the medium of such shim or shims. Also in this connection to provide an arrangement whereby the flanges of the door pillar and the companion or adjacent parts of the bumper block are provided with openings and lugs respectively which interlock to retain the bumper block in place.

In connection with the foregoing it is a more specific object to so arrange the openings in the door pillar flanges so that they are elongated in the direction of door closing movement, thus making it possible to raise the body portion of the bumper block with respect to the door pillar ledge by placing shims or the like between the head of the bumper block and the ledge in order to adjust the bumper block head and its contact surface in the direction of door closing movement. This will make it possible to adjust the device from time to time or in the initial installation so as to ensure the proper engagement of the edge portion of the door against the door bumper.

It is also an object to provide an arrangement in which the bumper block can be secured to the door pillar without the use of special clips or other extraneous devices.

Other objects and uses of the invention will appear from a detailed description of the same which consists in the features of construction and combinations of parts hereinafter described and claimed.

In the drawing:

Figure 1 shows a fragmentary face view of a short section of door pillar having applied thereto a bumper block embodying the features of the present invention, the head portion of the said bumper block being shimmed up according to one of the features of the present invention;

Figure 2 shows a perspective view of the bumper block itself disconnected from the door pillar;

Figure 3 shows a perspective fragmentary view of a short section of door pillar embodying the features of the present invention;

Figure 4 shows a back view corresponding to Figure 1, with the exception that the bumper block is not shimmed up. Figure 4 may also be considered as a longitudinal section on the line 4—4 of Figure 5 looking in the direction of the arrows;

Figure 5 shows a cross section on the broken line 5—5 of Figure 4 looking in the direction of the arrows;

Figure 6 shows a fragmentary horizontal section on the line 6—6 of Figure 5 looking in the direction of the arrows, and Fig. 7 is a cross section on the line 7—7 of Fig. 1, to better illustrate the shim.

This application is a continuation in part of my copending application Serial No. 527,129, filed April 2, 1931.

In the construction illustrated the door pillar 10 is provided with the ledge 11 which faces in the direction of door closing movement and is also provided with the inwardly and outwardly extending flanges 12 and 13 respectively, lying in the direction of door closing movement.

At the position of the bumper block the ledge 11 is left uncut; but the flange 13 is provided with a pair of openings 14 and 15 which are separated from each other so that the outer or more separated ends are distant from each other an amount substantially equal to the length of the head portion of the bumper block. The inwardly extending flange 12 is also provided with an opening 16 substantially in transverse alignment with the position of the bumper block.

The bumper block 17 includes the head portion 18 which rests upon and is supported either by the ledge 11 or the shim presently to be referred to. The head portion 18 of the bumper block is also provided with the backwardly and upwardly extending hooked lugs 19 and 20 which are hooked and extended through the openings 14 and 15 as best shown in Figure 5. If desired the notches 21 may be provided at the points where said lugs join the body 18 of the bumper block.

In the particular construction illustrated the bumper block is also provided with a lip or skirt portion 22 which overlaps the flange 12 at the position of the bumper block. This lip or skirt 22 is provided with a backwardly reaching undercut lug or button 23 which can be forced through the opening 16 of the flange 12 in order to secure the parts together.

It will be noted that normally the head portion 18 of the bumper block lies directly upon the ledge 11. It will also be seen from Figure 3 in part that openings 14 and 15 of the flange are tapered in height, being higher adjacent to the central portion of the bumper block than adjacent to its ends. Examination of Figure 5 also shows that the opening 16 of the flange 12 is elongated vertically as compared to the lug or button 23.

As a consequence of the above features it is possible to place or force a shim 24 between the ledge 11 and the body portion of the bumper block, causing said body portion to be curved or bent upwardly as clearly shown in Figure 1. Under these conditions the lugs 19 and 20 will assume a deflected form which is possible owing to the form of the openings 14 and 15; and at the same time the lug 23 may move up to the top of the opening 16 as clearly shown in Figure 1.

While I have herein shown and described only a single embodiment of the features of my present invention I do not intend to limit myself except as I may do so in the claims.

I claim:

1. A door buffer device comprising a pillar member having an impact ledge facing in the direction of door closing movement, and a buffer block extending across the impact surface of said ledge, said pillar member having means adjacent opposite sides of said ledge cooperating with said block and constituting the sole securing and anchoring means for said block on said ledge, the block by virtue of the construction of the last mentioned means being slidable in the direction of door closing movement relative to the pillar member and toward the door, without disturbing the anchorage of the block, whereby to dispose the block in a predetermined desired relation to the pillar member for efficient cushioning action.

2. A door buffer device as set forth in claim 1 including means interposed between the block and the ledge to support the block in a predetermined elevated adjusted position.

3. A door buffer device comprising a pillar member formed to provide an impact ledge facing in the direction of door closing movement, and oppositely extending side flanges, each of said flanges having an opening provided therein, a bumper block extending across said ledge and having portions overlying said openings, and means passing through said openings and anchoring said block on opposite sides of said ledge, the block by virtue of the construction of the openings and means entered therein being slidable in the direction of door closing movement relative to the pillar member and toward the door, without disturbing the anchorage of the block, whereby to dispose the block in a predetermined desired relation to the pillar member for efficient cushioning action.

4. A door buffer device as set forth in claim 3 including means interposed between the block and the ledge to support the block in a predetermined elevated adjusted position.

5. A door buffer device comprising a pillar member formed to provide an impact ledge facing in the direction of door closing movement, and oppositely extending side flanges, one of said flanges having a pair of openings spaced with respect to each other lengthwise relative to the ledge and the other flange having an opening provided therein at a point intermediate the aforesaid openings, and a bumper block extending across said ledge and having lug means engaging the openings in said flanges, the openings and lugs being formed so as to permit a certain amount of movement of the intermediate portion of the block in the direction of door closing movement outwardly relative to the pillar member, without disturbing the anchorage of the block, there being means arranged to be interposed between the intermediate portion of the block and the ledge to support said portion in elevated position relative to the ledge.

6. A device as set forth in claim 5 wherein the pair of openings are formed wider at one end than at the other in the direction of door closing movement with the wider ends facing toward each other.

7. A device as set forth in claim 5 wherein the pair of openings are formed wider at one end than at the other in the direction of door closing movement with the wider ends facing toward each other, and wherein the other opening is elongated in the direction of door closing movement.

8. A door buffer device comprising a pillar member formed to provide an impact ledge facing in the direction of door closing movement, and oppositely extending side flanges, one of said flanges having a pair of openings spaced with respect to each other lengthwise relative to the ledge and the other flange having an opening provided therein at a point intermediate the aforesaid openings, and a bumper block of resilient material extending across said ledge and having lug means engaging the openings in said flanges, said block by virtue of its resilience and the location of the lugs being adapted to have the impact portion thereof between the lugs flexed in the direction of door closing movement outwardly relative to the ledge, there being means interposed between the back of the block and the ledge to support the block in flexed condition for efficient door cushioning action.

IRA D. PERRY.